United States Patent
Sicking et al.

(10) Patent No.: US 10,115,200 B2
(45) Date of Patent: Oct. 30, 2018

(54) SYSTEMS AND METHODS FOR ANALYZING SPORTS IMPACTS

(71) Applicant: THE UAB RESEARCH FOUNDATION, Birmingham, AL (US)

(72) Inventors: Dean Sicking, Indian Springs Village, AL (US); Seth Cohen, Birmingham, AL (US); Dennis Leonard, Birmingham, AL (US)

(73) Assignee: UAB RESEARCH FOUNDATION, Birmingham, AL (US)

( * ) Notice: Subject to any disclaimer, the term of this patent is extended or adjusted under 35 U.S.C. 154(b) by 0 days.

(21) Appl. No.: 15/036,628

(22) PCT Filed: Nov. 14, 2014

(86) PCT No.: PCT/US2014/065815
§ 371 (c)(1),
(2) Date: May 13, 2016

(87) PCT Pub. No.: WO2015/073906
PCT Pub. Date: May 21, 2015

(65) Prior Publication Data
US 2016/0267663 A1  Sep. 15, 2016

Related U.S. Application Data

(60) Provisional application No. 61/904,184, filed on Nov. 14, 2013.

(51) Int. Cl.
*G06T 7/00* (2017.01)
*G06K 9/00* (2006.01)
(Continued)

(52) U.S. Cl.
CPC ........ *G06T 7/0046* (2013.01); *G06K 9/00261* (2013.01); *G06K 9/00342* (2013.01);
(Continued)

(58) Field of Classification Search
None
See application file for complete search history.

(56) References Cited

U.S. PATENT DOCUMENTS

2008/0291272 A1* 11/2008 Krahnstoever ......... G06T 7/246
348/143
2009/0290753 A1* 11/2009 Liu ..................... G06K 9/00718
382/100

(Continued)

OTHER PUBLICATIONS

Pellman, Elliot J., et al. "Concussion in professional football: reconstruction of game impacts and injuries." Neurosurgery 53.4 (2003): 799-814.*

(Continued)

*Primary Examiner* — Vu Le
*Assistant Examiner* — Tracy Mangialaschi
(74) *Attorney, Agent, or Firm* — Thomas | Horstemeyer, LLP; Christopher B. Linder; Jason M. Perilla

(57) ABSTRACT

In one embodiment, a method for analyzing sports impacts includes capturing video of game play from multiple locations using video cameras, tracking the heads of players of the games in the video, computing motion parameters of the heads, and determining if one or more of the motion parameters exceeds a threshold established for that parameter.

26 Claims, 6 Drawing Sheets

(51) Int. Cl.
*H04N 7/18* (2006.01)
*G06T 7/73* (2017.01)
*G06T 7/246* (2017.01)

(52) U.S. Cl.
CPC .......... *G06K 9/00771* (2013.01); *G06T 7/251* (2017.01); *G06T 7/75* (2017.01); *H04N 7/181* (2013.01); *G06T 2207/10016* (2013.01); *G06T 2207/10024* (2013.01); *G06T 2207/30221* (2013.01)

(56) References Cited

U.S. PATENT DOCUMENTS

| | | | | |
|---|---|---|---|---|
| 2010/0030350 | A1* | 2/2010 | House | A63B 24/0021 |
| | | | | 700/91 |
| 2011/0090344 | A1 | 4/2011 | Gefen et al. | |
| 2011/0205022 | A1* | 8/2011 | Cavallaro | A63B 24/0021 |
| | | | | 340/8.1 |
| 2012/0265698 | A1* | 10/2012 | Kidd | G01M 17/0078 |
| | | | | 705/306 |
| 2013/0066448 | A1 | 3/2013 | Alonso | |
| 2013/0346009 | A1* | 12/2013 | Winter | G01D 11/00 |
| | | | | 702/96 |

OTHER PUBLICATIONS

Newman, J. A., et al. "A new biomechanical assessment of mild traumatic brain injury: Part 1—Methodology." Proceedings of the International Research Conference on the Biomechanics of Impacts (IRCOBI). 1999.*
International Search Report for PCT/US2014/065815 dated Feb. 19, 2015.

* cited by examiner

SYSTEMS AND METHODS FOR ANALYZING SPORTS IMPACTS

CROSS-REFERENCE TO RELATED APPLICATION

This application is the 35 U.S.C. § 371 national stage application of PCT Application No. PCT/US2014/065815, filed Nov. 14, 2014, which claims priority to U.S. Provisional Application Ser. No. 61/904,184, filed Nov. 14, 2013, both of which are hereby incorporated by reference herein in their entirety.

BACKGROUND

The health and safety of athletes during sports is becoming increasingly important with society's increased awareness of the cumulative effects of many minor traumatic brain injuries. Several American college-level football teams have integrated accelerometers into the players' helmets that trigger on large impacts and record the resulting accelerations to provide a way to detect and understand minor traumatic brain injuries in sports. This information is wirelessly transmitted to the sideline for post-game analysis by coaches and research scientists. Although the primary goal of these devices has been to identify impact conditions for the purpose of establishing helmet performance standards, some scientists have proposed that instrumented football helmets could be used to monitor the impact history of professional players.

Outfitting helmets with accelerometers for the purpose of understanding impact conditions and monitoring player exposure has serious drawbacks. As an initial matter, helmet instrumentation cannot measure the actual velocity of a helmet. Football helmets are elastic and restore much of the energy absorbed during the impact. These "elastic" impacts between two helmets cause the helmets to rebound and, as a result, the total changes in velocity measured by the helmet accelerometers are typically higher than the original impact speed. Because helmet performance standards must start with the establishment of the range of impact velocities that players experience, the use of helmet accelerometers is fundamentally flawed. As a further matter, the cost of providing accelerometers in every helmet is generally out of reach for most high schools and many college schools. Due to the inability of accelerometers to measure true impact velocities and the high costs of implementing these systems, this approach is impractical for most organized football leagues.

From the above discussion, it can be appreciated that, in order to provide safe monitoring of all sports players, a new, cost-effective solution for analyzing impacts is needed.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, a new, cost-effective solution is needed to analyze sports impacts in order to provide safe monitoring of all players of the sports. Disclosed herein are systems and methods for analyzing such impacts. As described below, the systems and methods analyze video of a sporting event captured from multiple locations to track the heads (or helmets) of the players and determine when an incident, such as a head impact, occurs that may have caused a minor or major traumatic brain injury. In some embodiments, motion parameters of the head, including velocities and accelerations, are automatically computed from the video data and are compared with predetermined thresholds beyond which injury is likely. When one or more of the motion parameters exceeds the threshold established for that parameter, an alert can be issued and information concerning the incident can be logged. In some embodiments, a player's entire sports career, from youth through adulthood, can be tracked in this manner to create a complete record of every blow sustained by the player while playing the sport that may have caused a brain injury. This information can be used by appropriate persons, such as coaches and physicians, in making treatment or eligibility recommendations.

In the following disclosure, various specific embodiments are described. It is to be understood that those embodiments are example implementations of the disclosed inventions and that alternative embodiments are possible. All such embodiments are intended to fall within the scope of this disclosure.

As is described above, disclosed herein are video-based systems and methods for analyzing sports impacts. The systems and methods can be used to track helmet velocities in real time to evaluate the risk of traumatic brain injuries during sporting events, such as American football games or practices. Although American football is discussed below with particularity, it is noted that the systems and methods can be used for any contact sport, as well as non-contact sports in which impacts to the head are still possible. Indeed, the systems and methods can be applied to any situations in which head impacts are possible.

Figure 1:
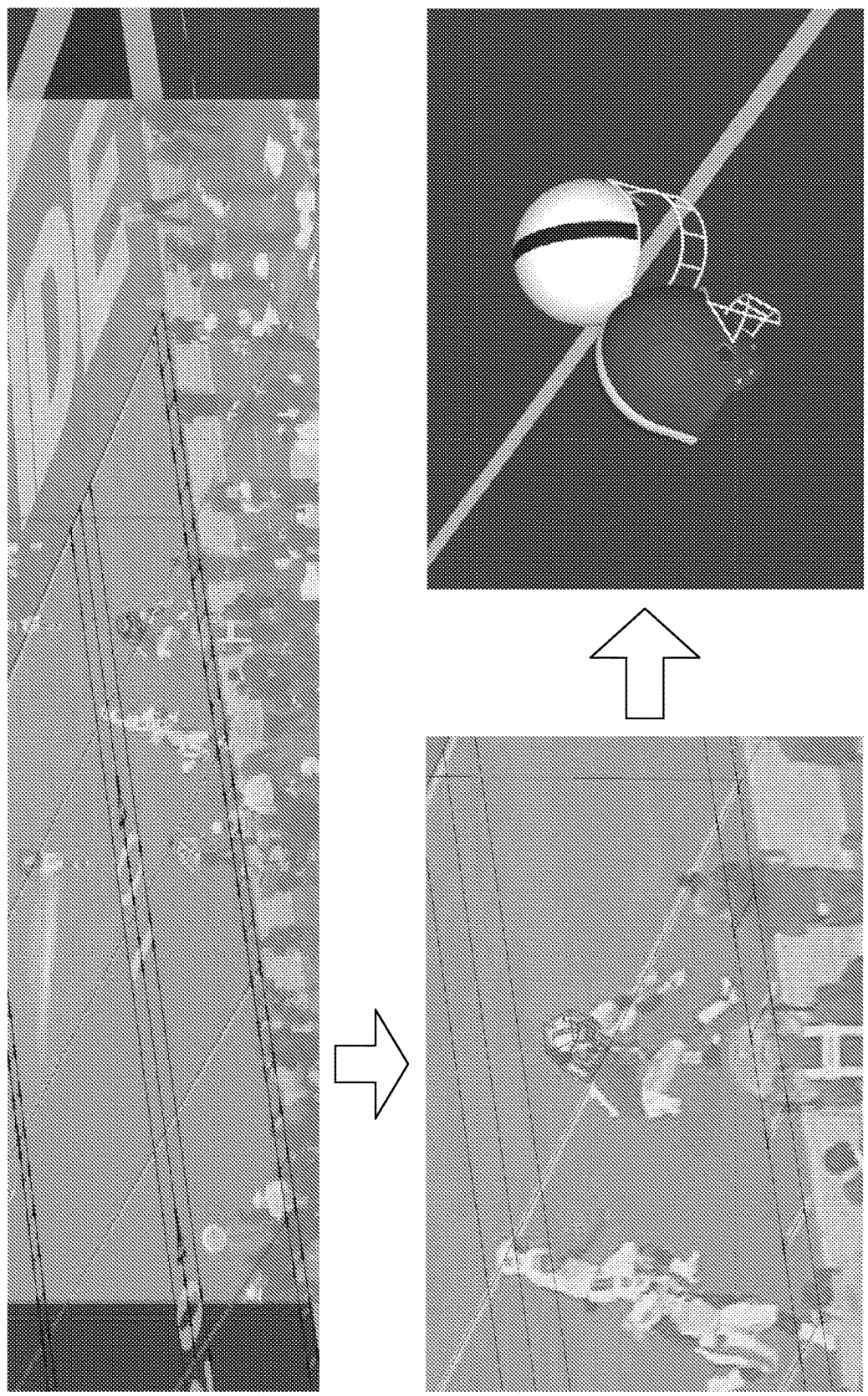
FIG. 1 is a schematic diagram that illustrates the analysis of sports impacts using video data of a sporting event.

In some embodiments, multiple cameras are set up around a field of play and a three-dimensional motion tracking algorithm is used to track players' helmets on the field. Such tracking is schematically illustrated in FIG. 1. As is depicted in this figure, video data of the sporting event is captured (top image) and helmets can be tracked in each frame of the video (bottom left image) so as to model and compute parameters of the impact that are indicative of possible brain injury (bottom right image). In this process, the velocity of each helmet can be tracked in three-dimensional space and used to determine the change in velocity for each helmet. In some embodiments, if a helmet has a change in velocity that exceeds a safe threshold, the player wearing the helmet can be flagged for risk of a traumatic brain injury and a record of the incident and its parameters can be recorded.

Rather than using accelerometers to measure accelerations associated with impacts, the continuous monitoring of football impacts is achieved through automated, real-time, video analysis of helmets. This technique uses specialized software that is completely automated and uses live video streams of the event and a computing system for analysis. In some embodiments, the video streams are recorded using four, high-speed, high-resolution cameras placed at optimized locations in the stadium or practice field. These cameras capture different viewing angles of all player helmets throughout the sporting event. The live video streams are synchronized such that the captured frames from each camera correspond to the same moment in time.

Within each frame of these synchronized video streams, the analysis software detects player helmets. Using the helmet locations in each frame along with the painted lines on the fields, the software can combine the information obtained from all of the camera views to compute the three-dimensional position and orientation of each helmet at each moment in time.

Based on the frame rate of the cameras, the position and orientation information of the helmets can be stepped forward in time to calculate translational and angular velocities, respectively. These velocities yield information about the initial conditions for each impact and are continuously monitored such that, when above a certain threshold, an alarm indicates a likelihood of injury. This is similar to the triggering mechanism for the accelerometers. However, because the live video streams are easily saved, post analysis of the game enables the calculation of all velocity changes. Thus, a database of all significant velocity changes for each player helmet can be updated after every event and analyzed. With a large enough database, the probability of a brain injury can also be calculated during and after a game and the long term effects of small, repetitive impacts can be studied.

In addition, the details of any identified high speed impact can be quickly determined to provide much needed information for trainers and physicians attempting to identify the risk of a concussion or more serious traumatic brain injury. Perhaps more significant, organizations, such as schools, can use the systems to create a record of every hard head impact that each player experiences throughout his or her career, starting in junior high and progressing through high school and college. These individual histories of head impacts can then be used to select the best medical treatment for each player.

Aside from the additional advantages in safety offered by the disclosed systems and methods, there is also less hardware as compared to accelerometer-based systems. Furthermore, because all of the hardware is on the sidelines (as opposed to installed in player helmets), the need for repairs and re-calibration is also reduced. Lastly, because the systems record the entire event, its safety advantages can be offered simultaneously to both competing teams (home and away teams), which is not possible with accelerometers unless all players on both teams have them.

Figure 2:
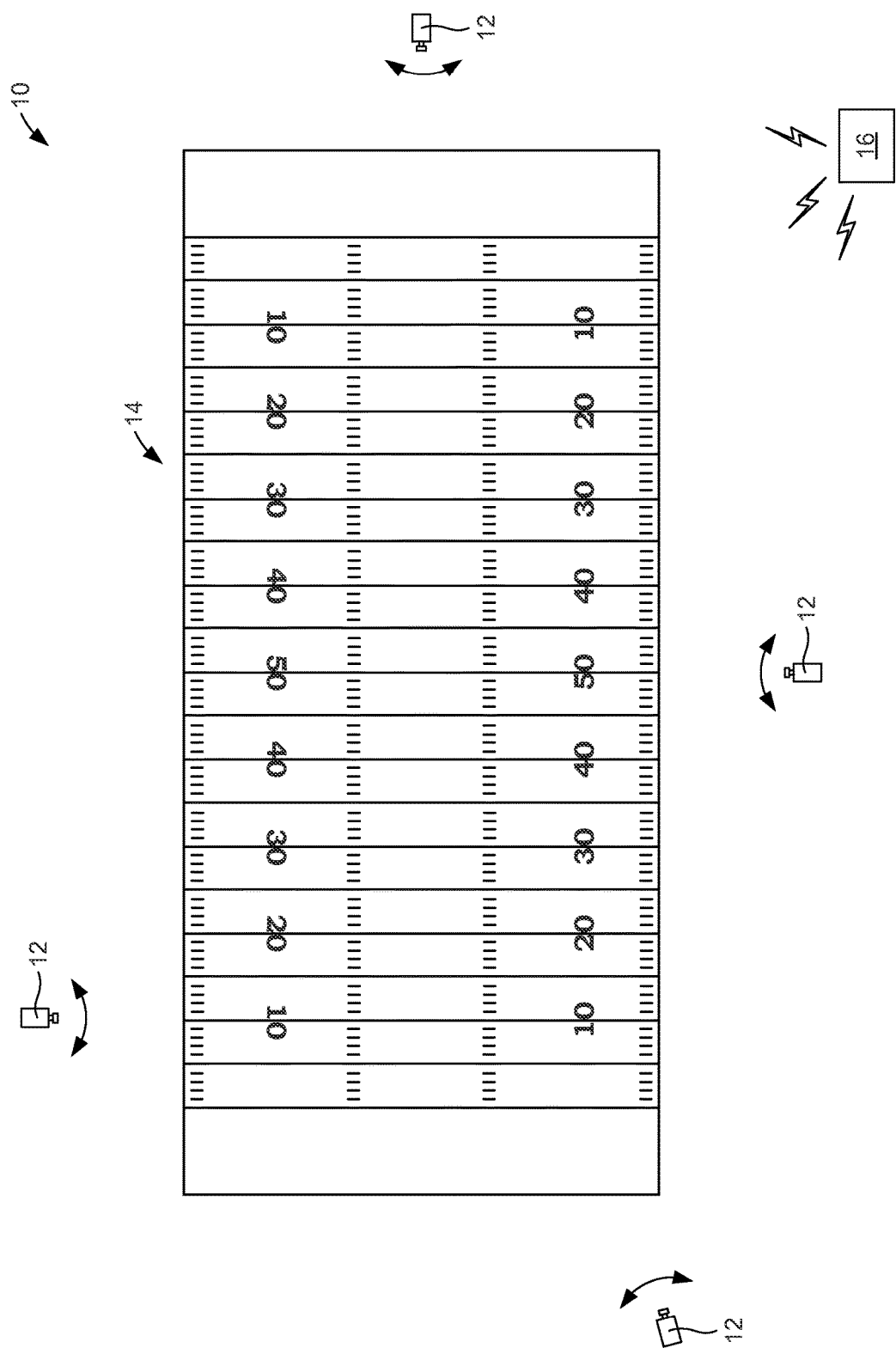
FIG. 2 is a schematic view of an embodiment of a system for analyzing sports impacts.

FIG. 2 illustrates components of an example system 10 for analyzing sports impacts. As shown in the figure, the system 10 generally comprises multiple digital video cameras 12 that are positioned at different locations around the periphery of a field of play 14. In some embodiments, each camera 12 comprises a high-speed, high-resolution video camera. By way of example, each camera 12 can capture video at 120 frames per second (fps) with a resolution of approximately 8.8 megapixels per frame. Each camera 12 can be placed in an elevated position that is beyond the edges of the field 14. By way of example, each camera 12 can be positioned approximately 15 to 100 feet above the surface of the field 14 at a distance of approximately 15 to 100 feet from the edge of the field. When the field 14 is located within a stadium, one or more of the cameras can be positioned within the stands of the stadium.

As shown in FIG. 2, the cameras 12 can be located at distinct positions around the periphery of an American football field 14. In the example of FIG. 1, a first camera 12 is aligned with the 50 yard line of the field 14, a second camera is aligned with the centerline of a first end zone of the field, a third camera is positioned at a 10 yard line of the field, and a fourth camera is near a corner of a second end zone of the field. This configuration results in the cameras 12 capturing different viewing angles of all player helmets throughout the game or practice. While a particular configuration is shown in FIG. 2, it is noted that many alternative camera configurations are possible. As is suggested by the curved arrows, the cameras 12 can, in some embodiments, be panned. In addition, the cameras can zoomed to focus in on the action on the field 14.

With further reference to FIG. 2, the system 10 also includes a computing system 16 that receives video data from the cameras 12. In some embodiments, the video data is wirelessly transmitted from the cameras 12 to the computing system 16. In other embodiments, communication cables (not shown) can be used to deliver the video data from the cameras 12 to the computing system 16. Regardless of the manner in which the video data is received, the computing system 16 can analyze the data to identify potentially injurious impacts.

Figure 3:
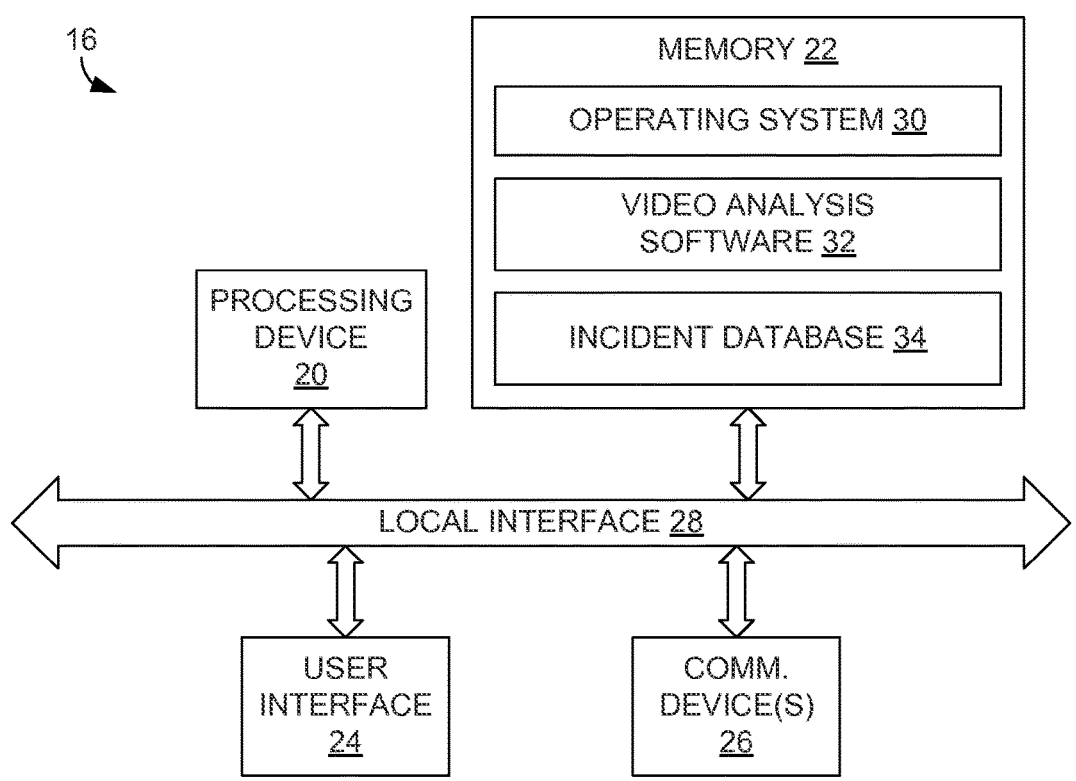
FIG. 3 is a block diagram of an embodiment of a computing system shown in FIG. 2.

FIG. 3 illustrates an example configuration for the computing system 16 shown in FIG. 2. As shown in FIG. 3, the computing device 16 generally includes a processing device 20, memory 22, a user interface 24, and at least one communication device 26, each of which is connected to a local interface (e.g., bus) 28. The processing device 20 can include a central processing unit (CPU) or a semiconductor-based microprocessor (in the form of a microchip). The memory 22 includes any one of or a combination of volatile memory elements (e.g., RAM) and nonvolatile memory elements (e.g., hard disk, ROM, Flash, etc.). The user interface 24 comprises the components with which a user interacts with the computing device 16, while the communication devices 26 are adapted to facilitate communications with other devices, such as the video cameras 12. In some embodiments, the communication devices 26 include a wireless transceiver.

The memory 24 (a non-transitory computer-readable medium) comprises programs including an operating system 30 and video analysis software 32. The video analysis software 32 includes one or more algorithms (logic) configured to analyze the video data received from the cameras 12 by detecting helmets in the frames of the data and computing motion parameters for the detected helmets. In addition, the software 32 can issue alerts when a motion parameter exceeds an established threshold and record information concerning incidents in which a parameter has been exceeded. Details of the execution of the video analysis software 32 are provided in relation to the flow diagrams of FIGS. 4 and 5.

As is further shown in FIG. 3, the memory 22 stores an incident database 34 that can be used to store the information relevant to the incidents in which one or more motion parameters have been exceeded. In some embodiments, the database 34 can be organized by player, in which case, a complete record can be established for each player.

Figure 4:
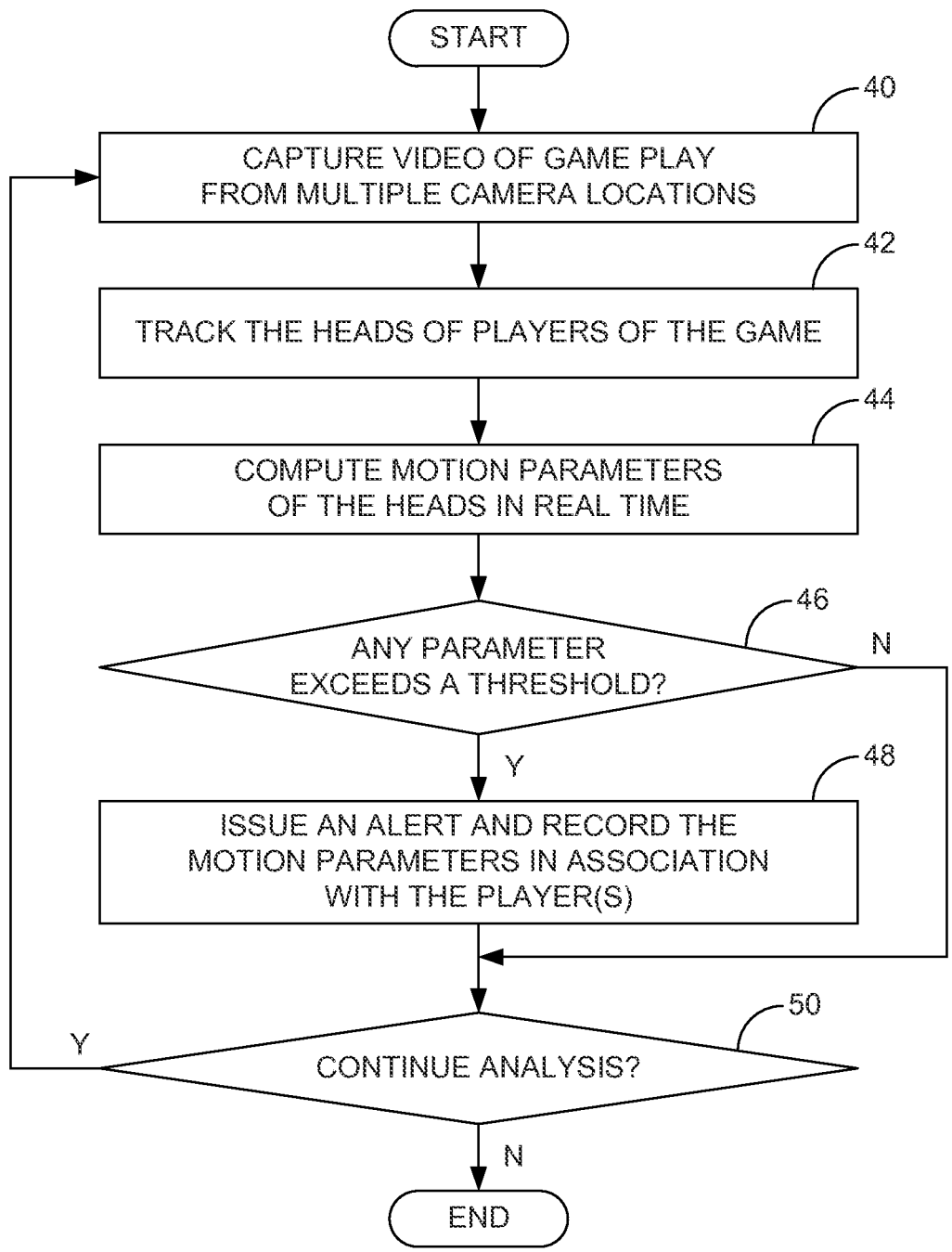
FIG. 4 is flow diagram of an embodiment of a method for analyzing sports impacts.

FIG. 4 is a flow diagram that illustrates an embodiment of a method for analyzing sports impacts. Beginning with block 40, video of game play is captured from multiple camera locations. As this video data is collected, it can be analyzed in real time to track the heads of the players playing the game, as indicated in block 42. In some embodiments, tracking the players' heads is performed by tracking helmets worn by the players.

Turning to block 44, motion parameters are computed for the tracked heads in real time. It is noted that, as used herein, the term "real time" describes computation during play as opposed to computation performed after the event is over. "Real time" does not necessarily mean instantaneous, however, as the computations require time (e.g., several seconds to a minute) to complete. The motion parameters can include the linear and angular velocities as well as the linear and angular accelerations of the head.

Referring next to decision block 46, it is determined whether or not any of the computed motion parameters exceeds a threshold for that parameter. Although the thresholds can be selected by the user of the system (e.g., coach or physician), they are typically set to a level beyond which a traumatic brain injury is possible or likely. If a threshold is exceeded, an alert can be issued and the motion parameters associated with the incident can be recorded in association with the player or players, as indicated in block 48. After the data has been recorded, flow continues to decision block 50 at which it is determined whether or not the video analysis is to continue. Assuming the event is ongoing, flow will return to block 40 and the above-described process is repeated. Accordingly, video of the event can be continually or continuously captured and analyzed to ensure that no incidents in which a brain injury may occur are missed.

Returning to decision block 46, if none of the parameters exceeds the threshold, no incident has been detected in which a brain injury is possible or likely and flow also continues to decision block 50.

Figure 5A:
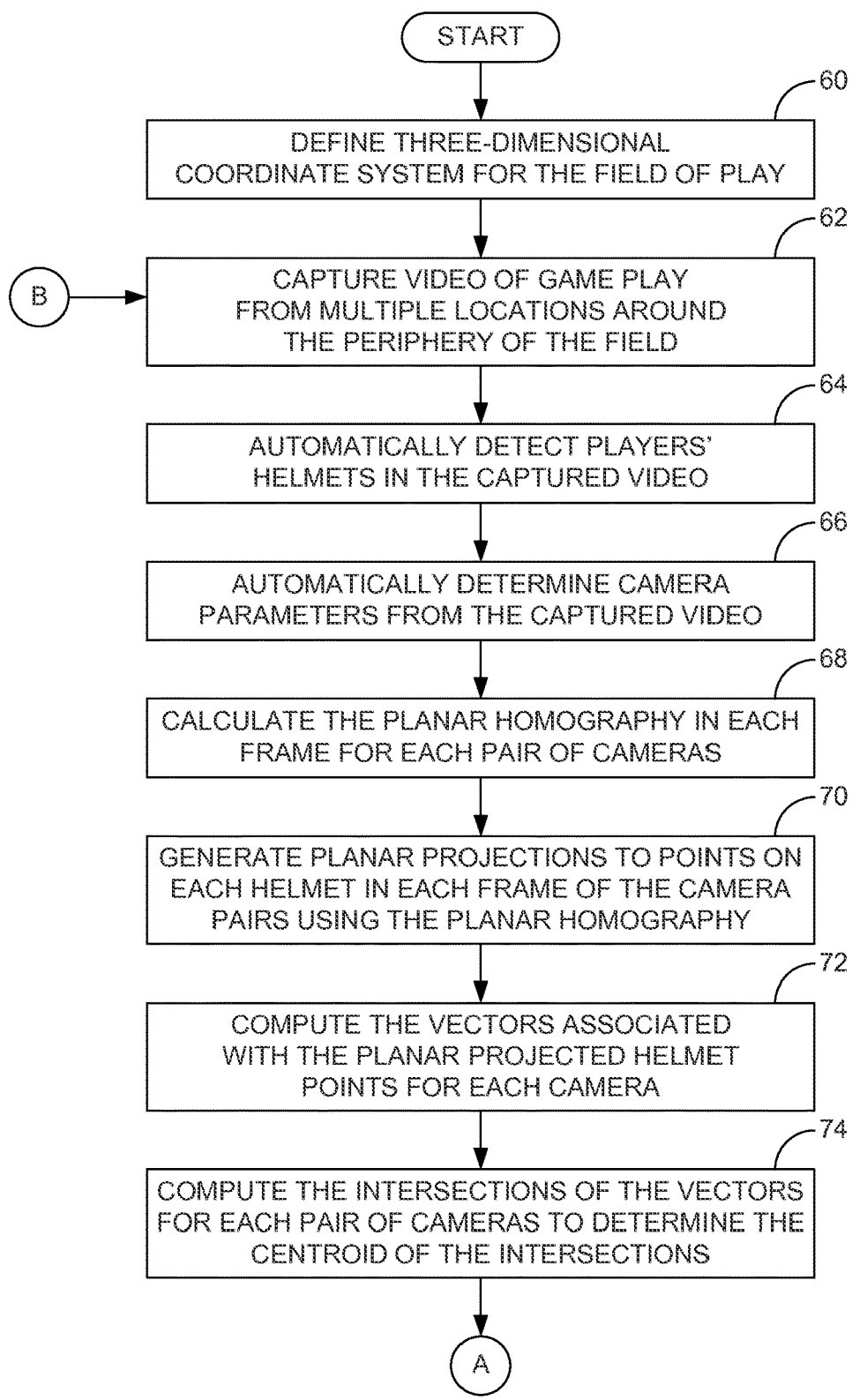
FIGS. 5A and 5B together comprise a flow diagram of a further embodiment of a method for analyzing sports impacts.
Figure 5B:
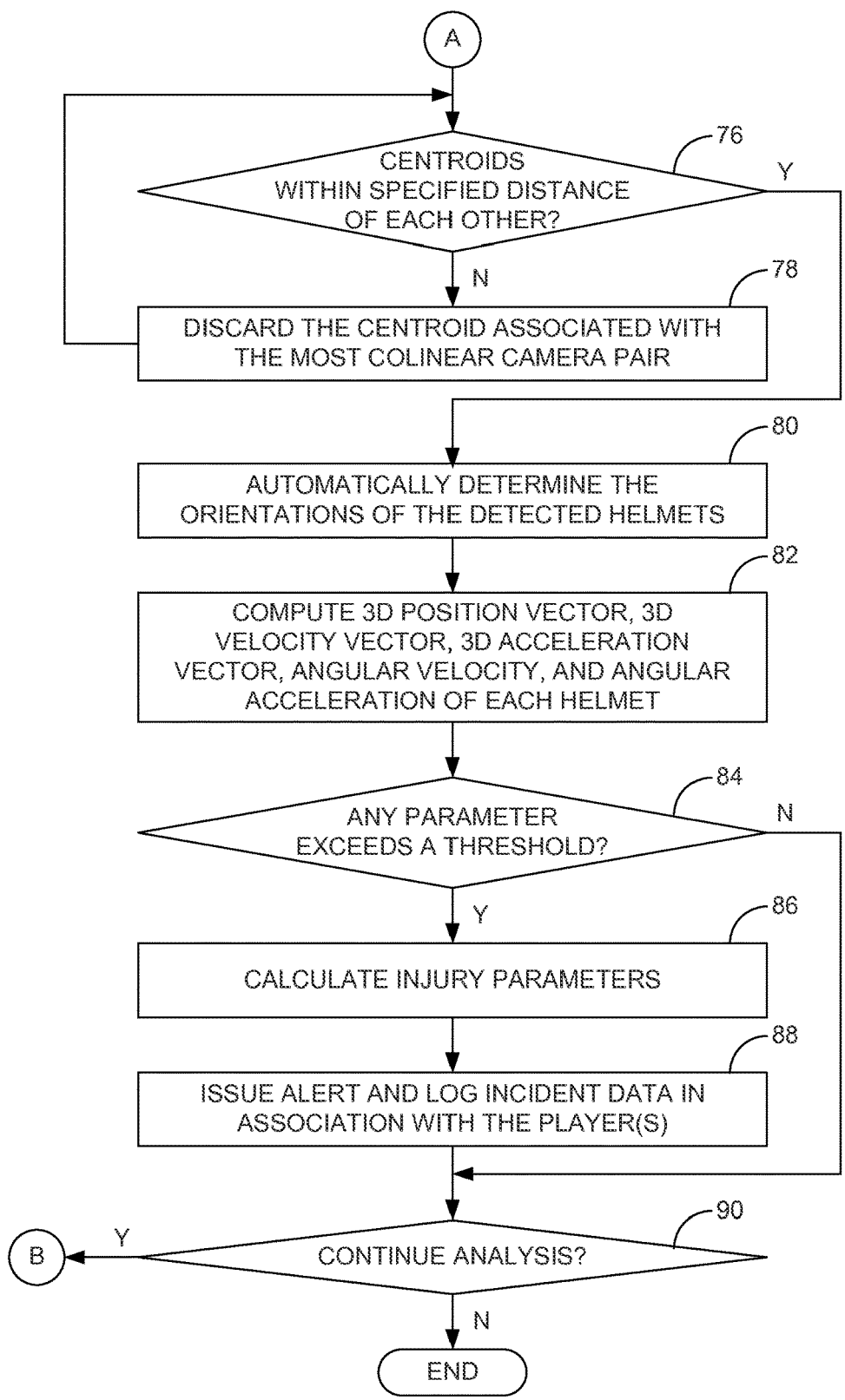

FIGS. 5A and 5B together comprise a flow diagram that illustrates a further embodiment of a method for analyzing sports impacts. Beginning with block 60 of FIG. 5A, a three-dimensional coordinate system is defined for the field of play that is to be used for each of the video cameras of the system. The origin point of the system can be set to any point on the field. As an example, in cases in which the sport is American football, the origin point can be set to be a rear corner of one of the end zones. In such a case, each position (x, y, z) on the field is treated as a positive position within the coordinate system.

Once the coordinate system has been defined, video of the game play can be captured from multiple locations around the periphery of the field, as indicated in block 62. As described above, four video cameras can be used and can be positioned in the configuration shown in FIG. 2. It is noted, however, that a smaller or a larger number of cameras can be used, if desired. For example, as few as two cameras can be used, although the accuracy of the computations may be adversely affected.

As the video data is captured, it is provided to a computing device for real-time analysis. As described above, the data can be transmitted wirelessly or using an appropriate communications cable. Regardless, as the video data is received, the video analysis software resident on the computing device automatically detects the players' helmets in the captured video, as indicated in block 64. In some embodiments, this detection is performed using three-dimensional models of the helmets worn during the game. For example, two models can be generated, one for each of two teams playing in a game. Alternatively, one model can be generated if the event is a practice during which only members of the same team are participating. The models can include details about the helmets that assist in helmet detection. Such details can include the colors of the helmets, any graphics (e.g., team logos and stripes) provided on the helmets, the shapes of the helmets, and any unique features of the helmet (e.g., face mask). In some embodiments, the details can further include unique player identification codes that are provided on the helmets that facilitate the identification of each player involved in an incident in which a brain injury is possible or likely. Such a code can, in some embodiments, comprise a one- or two-dimensional bar code that is applied to the helmet in one or more locations on the helmet's exterior surface. Regardless of the specific details of the models that are used, the three-dimensional models can be "observed" by the software from multiple views in an attempt to match helmets visible in the two-dimensional video frames captured by the cameras.

In addition to detecting helmets, the video analysis software further automatically determines the camera parameters of each camera from the captured video, as indicated in block 66. The camera parameters include the position of the camera, its orientation, and its zoom setting, the latter two of which being parameters that can change during the event. In some embodiments, each camera can be controlled by a human operator who can adjust the field of view of the camera by panning it and/or adjusting the zoom to keep the camera focused on the action on the field. The camera orientation and zoom can be automatically determined by the software with reference to a model of the field based upon one or more images of the field captured by each camera prior to the initiation of the event (e.g., start of the game). In such a case, features within each frame captured by each camera can be matched with like features within the model, which enables computation of the camera orientation and zoom setting.

At this point in the process, the determined locations of the helmets can be refined by calculating the planar homography in each frame for each pair of cameras, as indicated in block 68. In cases in which four cameras are used, six pairings of cameras result and a planar homography can be calculated for each. In this process, multiple (e.g., four) points can be identified on the field proximate to a detected helmet in each frame. Given four visible points on the field with pixel locations $[(p_{x1}, p_{y1}), (p_{x2}, p_{y2}), (p_{x3}, p_{y3}), (p_{x4}, p_{y4})]$ and respective three-dimensional world coordinates $[(x_1, y_1, z_1=0), (x_2, y_2, z_2=0), (x_3, y_3, z_3=0), (x_4, y_4, z_4=0)]$, the homography matrix is defined as:

$$D_{2D} = \sqrt{(p_{x1}-p_{x2})^2 + (p_{y1}-p_{y2})^2}$$

where [a, b, c, d, e, f, g, h] can be obtained by solving:

$$\begin{bmatrix} a & b & c \\ d & e & f \\ g & h & 1 \end{bmatrix} \begin{bmatrix} p_{x1} & p_{y1} & 1 & 0 & 0 & 0 & -x_1 p_{x1} & -x_1 p_{y1} \\ 0 & 0 & 0 & p_{x1} & p_{y1} & 1 & -y_1 p_{x1} & -y_1 p_{y1} \\ p_{x2} & p_{y2} & 1 & 0 & 0 & 0 & -x_2 p_{x2} & -x_2 p_{y2} \\ 0 & 0 & 0 & p_{x2} & p_{y2} & 1 & -y_2 p_{x2} & -y_2 p_{y2} \\ p_{x3} & p_{y3} & 1 & 0 & 0 & 0 & -x_3 p_{x3} & -x_3 p_{y3} \\ 0 & 0 & 0 & p_{x3} & p_{y3} & 1 & -y_3 p_{x3} & -y_3 p_{y3} \\ p_{x4} & p_{y4} & 1 & 0 & 0 & 0 & -x_4 p_{x4} & -x_4 p_{y4} \\ 0 & 0 & 0 & p_{x4} & p_{y4} & 1 & -y_4 p_{x4} & -y_4 p_{y4} \end{bmatrix} \begin{bmatrix} a \\ b \\ c \\ d \\ e \\ f \\ g \\ h \end{bmatrix} = \begin{bmatrix} x_1 \\ y_1 \\ x_2 \\ y_2 \\ x_3 \\ y_3 \\ x_4 \\ y_4 \end{bmatrix}$$

Once the planar homographies have been calculated for the camera pairs, they can be used to generate planar projections from each camera to points (pixels) on the detected helmet in each frame, as indicated in block 70. In some embodiments, a planar projection can be generated for each of four points along the edges of the detected helmet. Given the homography matrix, a helmet pixel location $(p_x, p_y)$ can be projected onto the world coordinate field to the point $(h_x, h_y, h_z=0)$ by the following:

$$\begin{bmatrix} h_x \\ h_y \\ 1 \end{bmatrix} = \frac{\begin{bmatrix} a & b & c \\ d & e & f \\ g & h & 1 \end{bmatrix}\begin{bmatrix} p_x \\ p_y \\ 1 \end{bmatrix}}{[g\ h\ 1]\begin{bmatrix} p_x \\ p_y \\ 1 \end{bmatrix}}$$

Next, with reference to block 72, the vectors associated with the planar projected helmet points can be computed. Given the Camera 1 location ($c_{x1}$, $c_{y1}$, $c_{z1}$), Camera 2 location ($c_{x2}$, $c_{y2}$, $c_{z2}$), Helmet 1 projection in Camera 1 view ($h_{x1}$, $h_{y1}$, $h_{z1}$=0), and Helmet 1 projection in Camera 2 view ($h_{x2}$, $h_{y2}$, $h_{z2}$=0), the camera-to-plane vectors are:

$$V_1 = (c_{x1} - h_{x1}, c_{y1} - h_{y1}, c_{z1} - h_{z1})$$

$$V_2 = (c_{x2} - h_{x2}, c_{y2} - h_{y2}, c_{z2} - h_{z2})$$

Referring to block 74, the intersections of the computed vectors for each pair of cameras can be computed to determine the centroid of the intersections, which can be used to represent the three-dimensional position of the helmet. For vectors that do not perfectly intersect with each other, the lines of closest distance and their midpoints can be computed. A cost function that weights the midpoint distances as a function of the frames can then be computed. The minimum of the cost function corresponds to the most probable pair of synchronized frames. The mathematics of this process are described below.

Given the points $P_0 = (c_{x1}, c_{y1}, c_{z1})$, $P_1 = (h_{x1}, h_{y1}, h_{z1}=0)$, $Q_0 = (c_{x2}, c_{y2}, c_{z2})$, $Q_1 = (h_{x2}, h_{y2}, h_{z2}=0)$, compute the intersection/midpoint of $V_1$ and $V_2$ by:

$$u = P_1 - P_0,\ v = Q_1 - Q_0,\ w_0 = P_0 - Q_0,$$

$$A = u \cdot u,\ B = u \cdot v,\ C = v \cdot v,\ D = u \cdot w_0,\ E = v \cdot w_0,$$

$$S_c = \frac{BE - CD}{AC - B^2},\ t_c = \frac{AE - BD}{AC - B^2},\ R_0 = P_0 + S_c(P_1 - P_0),$$

$$R_1 = Q_0 + t_c(Q_1 - Q_0),\ M = R_0 + \frac{R_1 - R_0}{2} = (M_x, M_y, M_z),$$

$$D_x = |R_{0x} - R_{1x}|,\ D_y = |R_{0y} - R_{1y}|,\ D_z = |R_{0z} - R_{1z}|$$

where ($M_x$, $M_y$, $M_z$) are the intersections/midpoints and ($D_x$, $D_y$, $D_z$) are the distances in the x, y, and z directions of the vectors $V_1$ and $V_2$.

Each camera view $C_{1,2}$ contains footage with frames $f_1(i)$ for i=1 to $N_f$ and $f_2(j)$ for j=1 to $N_f$. The pairing of $f_1(i)$ with $f_2(j)$ depends on the choice for i and j. Ideally, i and j correspond to frames that represent the same moments in time. However, this is not always the case, and adjustments must be made to synchronize the camera footage. Thus, a cost function G can be computed:

$$G(I) = \Sigma_{i=I}^{N_f} D_x(i) + \Sigma_{i=I}^{N_f} D_y(i) + \Sigma_{i=I}^{N_f} D_z(i)$$

where I is a shift in the frame number pairing of $f_1(i)$ for i=I to $N_f$ relative to $f_2(j)$ for j=1 to $N_f$-I. Thus, for each value of I, a set of ($M_x$, $M_y$, $M_z$) and ($D_x$, $D_y$, $D_z$) are computed. The minimum of G corresponds to the frame pairing where ($D_x$, $D_y$, $D_z$) are minimized, and therefore the set of vectors $V_1$ and $V_2$ are the closest. This represents the synchronized pair of frames.

Referring next to decision block 76 of FIG. 5B, it is then determined whether the computed centroids from the camera pairs are within a specified distance of each other. Given the three-dimensional location of Helmet 1=($x_1$, $y_1$, $z_1$) and the three-dimensional pixel of Helmet 2=($x_2$, $y_2$, $z_2$) define the three-dimensional distance $D_{3D}$ as:

$$D_{3D} = \sqrt{(x_1 - x_2)^2 + (y_1 - y_2)^2 + (z_1 - z_2)^2}$$

If $D_{3D} > T_{3D}$, then YES. Otherwise, NO.

If one or more of the centroids is not within the specified distance, flow continues to block 78 at which the centroid associated with the most collinear camera pair is discarded. If three camera angles are utilized, the most collinear camera pair is the pair that is closest to 180° offset from one another about the centroid. If only two camera angles are utilized, they will be the most collinear pair by default. Then flow returns to decision block 76, and it is determined whether or not the remaining subset of centroids is within the specified distance. This process continues until all centroids are within the specified distance. Once this is achieved, flow continues to block 80 at which the orientations of the detected helmets are automatically determined. In some embodiments, this is achieved by synchronizing the detected helmets with the three-dimensional models of the helmets. As before, details of the helmets, such as color, graphics, and the like can be used to match the detected helmet with the model.

At this point, various parameters can be computed for each detected helmet. As indicated in block 82 of FIG. 5B, these parameters can include the three-dimensional position vector, the three-dimensional velocity vector, the three-dimensional acceleration vector, the angular velocity, and the angular acceleration. Accordingly, motion parameters, such as helmet (and head) velocities and accelerations, can be determined. As is described in the paragraphs that follow, these parameters can be computed in relation to the frame rates of the cameras.

Given the frame rate and the three-dimensional positions of the helmets as a function of the frame number i: Helmet 1—($H_{x1}(i)$, $H_{y1}(i)$, $H_{z1}(i)$), Helmet 2—($H_{x2}(i)$, $H_{y2}(i)$, $H_{z2}(i)$), the three-dimensional position as a function of time can be computed by creating a time array t(i)=[0, $\Delta t$, 2$\Delta t$, 3$\Delta t$, ..., $t_{max}$] where $$\Delta t = \frac{1}{\text{frame rate}},$$

$$t_{max} = (N_f - 1)\Delta t$$

and where $N_f$ is the total number of frames. Thus, the three-dimensional position vector as a function of time is given by:

Helmet 1—($H_{x1}[t(i)]$, $H_{y1}[t(i)]$, $H_{z1}[t(i)]$), Helmet 2—($H_{x2}[t(i)]$, $H_{y2}[t(i)]$, $H_{z2}[t(i)]$) or, using shorthand, Helmet 1—($H_{x1}(t)$, $H_{y1}(t)$, $H_{z1}(t)$), Helmet 2—($H_{x2}(t)$, $H_{y2}(t)$, $H_{z2}(t)$).

Given the three-dimensional helmet positions as a function of time, the three-dimensional velocity vectors as a function of time are given by: $v_1 - (v_{x1}[t(i)], v_{y1}[t(i)], v_{z1}[t(i)])$, $v_2 - (v_{x2}[t(i)], v_{y2}[t(i)], v_{z2}[t(i)])$, where $$v_{x1,2}[t(i)] = (H_{x1,2}[t(i)] - H_{x1,2}[t(i-1)])/\Delta t,$$

$$v_{y1,2}[t(i)] = (H_{y1,2}[t(i)] - H_{y1,2}[t(i-1)])/\Delta t,\ \text{and}$$

$$v_{z1,2}[t(i)] = (H_{z1,2}[t(i)] - H_{z1,2}[t(i-1)])/\Delta t.$$

Given the three-dimensional helmet velocities as a function of time, the three-dimensional acceleration vectors as a function of time are given by: $a_1 - (a_{x1}[t(i)], a_{y1}[t(i)], a_{z1}[t(i)])$, $a_2 - (a_{x2}[t(i)], a_{y2}[t(i)], a_{z2}[t(i)])$, where $a_{x1,2}[t(i)]=(v_{x1,2}[t(i)]-v_{x1,2}[t(i-1)])/\Delta t,$ $a_{y1,2}[t(i)]=(v_{y1,2}[t(i)]-v_{y1,2}[t(i-1)])/\Delta t,$ and $a_{z1,2}[t(i)]=(v_{z1,2}[t(i)]-v_{z1,2}[t(i-1)])/\Delta t.$ Given the angles ($\theta_{1,2}$, $\varphi_{1,2}$), which are determined from the helmet orientation function for helmets 1 and 2 of the frame number i, construct ($\theta_{1,2}[t(i)]$, $\varphi_{1,2}[t(i)]$).

The angular velocity $\omega_{1,2}$ of the helmet is given by:

$\omega_{1,2}[t(i)]=(\theta_{1,2}[t(i)]-\theta_{1,2}[t(i-1)])/\Delta t$

The angular acceleration $\alpha_{1,2}$ of the helmet is given by:

$\alpha_{1,2}[t(i)]=(\omega_{1,2}[t(i)]-\omega_{1,2}[t(i-1)])/\Delta t$

Once the various motion parameters have been computed, they can be compared to thresholds established for each parameter. In some embodiments, the thresholds are determined through mathematical estimation or empirical analysis to be levels beyond which brain injury, whether minor or major, is possible or likely. With reference to decision block 84, if one or more motion parameters, such as linear or angular acceleration of the head, has been exceeded, flow continues to block 86 at which injury parameters are calculated. The following are examples of quantities that can be computed.

Given, a(t) and/or $\alpha$(t) that cross threshold values (a(t)>$T_a$ or $\alpha$(t)>$T\alpha$), the following quantities can be computed:

$\alpha_{max}=\text{peak}(\alpha(t)),$ $\alpha_c=\int_{t1}^{t2} a(t)^{s1} dt,$ $\alpha_c=\int_{t1}^{t2} a(t)^{s2} dt$ where $t_1$ and $t_2$ are the time intervals of the threshold crossings for a(t) and $\alpha$(t) and where $s_1$ and $s_2$ are positive scaling factors.

Referring next to block 88, an alert can be issued, for example to a team's coach, trainer, or physician, and the motion parameters associated with the incident can be recorded in association with the player or players, as described above in relation to the flow diagram of FIG. 4. After the data has been recorded, flow continues to decision block 90 at which it is determined whether or not the video analysis is to continue. Assuming the event is ongoing, flow will return to block 62 of FIG. 5A and the above-described process is repeated.

The invention claimed is:

1. A method for identifying head impacts occurring during sporting events that may have caused brain trauma, the method comprising:
   capturing video data of a sporting event that involves a first team and a second team from multiple locations using multiple video cameras;
   generating a first three-dimensional model for a first helmet of the first team;
   generating a second three-dimensional model for a second helmet of the second team;
   analyzing the captured video data and, based solely upon that video data analysis:
      identifying a presence of the first helmet on a first player and the second helmet on a second player in the captured video data using the first three-dimensional model and the second three-dimensional model;
      computing motion parameters of the first helmet on the first player and the second helmet on the second player, wherein the motion parameters are determined without input from any sensors provided on the first player and the second player, or the first helmet or the second helmet;
   determining, in a collision that involves the first player and the second player, that one or more of the motion parameters exceeds a threshold beyond which brain trauma is possible; and
   recording the one or more motion parameters that exceeded the threshold to create a record of the collision that can be consulted when evaluating a health of the first player or the second player involved in the collision.

2. The method of claim 1, wherein capturing video comprises capturing video using multiple video cameras positioned at different locations around a periphery of a field of play of the sporting event.

3. The method of claim 2, wherein capturing video comprises capturing video with four video cameras.

4. The method of claim 1, wherein computing motion parameters comprises comparing frames captured by the cameras with one or more three-dimensional helmet models to identify the first player or the second player using one or more unique player identification codes shown on the first helmet or the second helmet.

5. The method of claim 1, wherein computing motion parameters comprises automatically determining camera parameters from the captured video.

6. The method of claim 5, wherein the camera parameters include camera orientation and zoom setting.

7. The method of claim 5, wherein automatically determining camera parameters comprises comparing frames captured by the cameras with a model of a field of play of the sporting event.

8. The method of claim 1, wherein computing motion parameters comprises calculating a planar homography for each pair of cameras.

9. The method of claim 8, wherein computing motion parameters further comprises generating planar projections from each camera to multiple points on each identified helmet using the planar homographies.

10. The method of claim 9, wherein computing motion parameters further comprises computing vectors associated with the planar projections.

11. The method of claim 10, wherein computing motion parameters further comprises computing intersections of the vectors for each pair of cameras.

12. The method of claim 11, wherein computing motion parameters further comprises computing centroids of the intersections for each pair of cameras.

13. The method of claim 1, wherein computing motion parameters comprises automatically determining orientations of the first helmet and the second helmet.

14. The method of claim 1, further comprising issuing an alert if one or more of the motion parameters exceeds a threshold established for that parameter.

15. The method claim 1, further comprising recording all computed motion parameters if one or more of the motion parameters exceeds a threshold established for that parameter.

16. A system for identifying head impacts occurring during sporting events that may have caused brain trauma, the system comprising:
   multiple video cameras adapted to capture video data of a sporting event that involves a first team and a second team from different locations;
   at least one computing device in communication with the video cameras comprising at least one hardware processor; and program instructions stored in memory and executable by the at least one computing device that, when executed, direct the at least one computing device to:
generate a first three-dimensional model for a first helmet of the first team;
generate a second three-dimensional model for a second helmet of the second team;
analyze the captured video data and, based solely on that video data analysis:
  identify a presence of the first helmet on a first player and the second helmet on a second player in the captured video data using the first three-dimensional model and the second three-dimensional model;
  compute motion parameters of the first helmet on the first player and the second helmet on the second player, wherein the motion parameters are determined without input from any sensors provided on the first player and the second player, or the first helmet or the second helmet;
determine, in a collision that involves the first player and the second player, that one or more of the motion parameters exceeds a threshold beyond which brain trauma is possible; and
record the one or more motion parameters that exceeded the threshold to create a record of the collision that can be consulted when evaluating a health of the first player or the second player involved in the collision.

17. The system of claim 16, wherein the system comprises four video cameras.

18. The system of claim 16, wherein the motion parameters are computed by comparing frames captured by the multiple cameras with one or more three-dimensional helmet models to identify the first player or the second player using one or more unique player identification codes shown on the first helmet or the second helmet.

19. The system of claim 16, wherein the motion parameters are computed by automatically determining camera parameters from the captured video.

20. The system of claim 16, wherein the motion parameters are computed by calculating a planar homography for each pair of cameras.

21. The system of claim 20, wherein the motion parameters are computed by generating planar projections from each of the multiple cameras to multiple points on each identified helmet using the planar homographies.

22. The system of claim 21, wherein the motion parameters are computed by computing vectors associated with the planar projections.

23. The system of claim 22, wherein the motion parameters are computed by computing intersections of the vectors for each pair of the multiple cameras.

24. The system of claim 23, wherein the motion parameters are computed by computing centroids of the intersections for each pair of the multiple cameras.

25. The system of claim 16, wherein the at least one computing device is further directed to issue an alert if one or more of the motion parameters exceeds a threshold established for that parameter.

26. The system claim 16, wherein the at least one computing device is further directed to record all computed motion parameters if one or more of the motion parameters exceeds a threshold established for that parameter.

* * * * *